United States Patent [19]

Oka

[11] Patent Number: 5,621,053

[45] Date of Patent: *Apr. 15, 1997

[54] POLYANILINE DERIVATIVES AND THEIR PRODUCTION PROCESS

[75] Inventor: Osamu Oka, Shizuoka, Japan

[73] Assignee: Tomoegawa Paper Co., Ltd., Shizuoka-ken, Japan

[*] Notice: The term of this patent shall not extend beyond the expiration date of Pat. No. 5,623,020.

[21] Appl. No.: 438,729

[22] Filed: May 10, 1995

Related U.S. Application Data

[60] Division of Ser. No. 128,570, Sep. 30, 1993, which is a continuation-in-part of Ser. No. 858,058, Mar. 26, 1992.

[30] Foreign Application Priority Data

| Apr. 1, 1991 | [JP] | Japan | 3-92650 |
| May 1, 1991 | [JP] | Japan | 3-126506 |
| May 1, 1991 | [JP] | Japan | 3-126507 |
| Jun. 21, 1991 | [JP] | Japan | 3-175704 |
| Jun. 28, 1991 | [JP] | Japan | 3-183858 |
| Jul. 5, 1991 | [JP] | Japan | 3-191218 |
| Aug. 26, 1991 | [JP] | Japan | 3-236907 |
| Aug. 26, 1991 | [JP] | Japan | 3-236908 |
| Oct. 9, 1991 | [JP] | Japan | 3-289437 |
| Oct. 11, 1991 | [JP] | Japan | 3-290373 |
| Dec. 6, 1991 | [JP] | Japan | 3-166122 |
| Dec. 12, 1991 | [JP] | Japan | 3-350616 |
| Jan. 17, 1992 | [JP] | Japan | 4-25952 |
| Jan. 17, 1992 | [JP] | Japan | 4-25954 |

[51] Int. Cl.$^6$ ............ C08G 71/00; C08L 79/00
[52] U.S. Cl. ............ 525/540; 525/58; 525/92 B; 525/185; 525/398; 525/420; 525/436; 525/437; 525/453; 525/474; 525/535
[58] Field of Search ............ 525/540

[56] References Cited

U.S. PATENT DOCUMENTS

| 4,851,487 | 7/1989 | Yaniger et al. | 525/540 |
| 4,855,361 | 8/1989 | Yaniger et al. | 525/436 |
| 5,095,076 | 3/1992 | Clement et al. | 525/435 |
| 5,100,977 | 3/1992 | Oka | 525/540 |
| 5,147,913 | 9/1992 | MacDiarmid et al. | 524/104 |
| 5,171,478 | 12/1992 | Han | 252/500 |
| 5,196,144 | 3/1993 | Smith et al. | 252/500 |
| 5,205,965 | 4/1993 | Uetani et al. | 252/500 |
| 5,237,023 | 8/1993 | Oka | 525/540 |
| 5,250,639 | 10/1993 | Oka | 525/540 |
| 5,320,716 | 6/1994 | Akhtar | 204/59 R |
| 5,441,772 | 8/1995 | McAndrew et al. | 427/388.1 |

*Primary Examiner*—Ana Woodward
*Attorney, Agent, or Firm*—Lowe, Price, LeBlanc & Becker

[57] ABSTRACT

This invention provides a novel cross-linked polyaniline derivative soluble or capable of swelling in general organic solvents, which forms an elastic self-standing film or fibers. The polyaniline derivative substantially comprises a polyaniline having number average molecular weight in a range of from 2,000 to 500,000 represented by the following formula (I) as the main polymer chain,

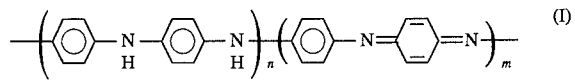

wherein
m and n are 0 or an integer of at least 1, $m/(m+n)=0-1$, and $m+n=10-5{,}000$, and cross-linking units represented by the following formula (II)

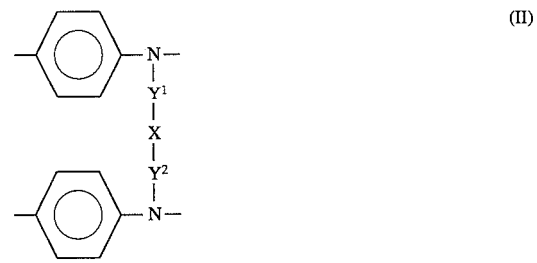

wherein X is a direct bond, a substituted or unsubstituted divalent $C_1$–$C_{30}$ aliphatic hydrocarbon group, a substituted or unsubstituted divalent aromatic hydrocarbon group, a divalent polysiloxane group or a group derived therefrom, or a divalent group derived from a compound having 2 or more repeating structural units, $Y^1$ and $Y^2$ which may be identical or different denote each a direct bond, $$-CO-,\ -C(=Z)NH-,\ -SO_a-,$$

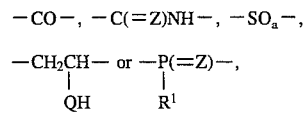

wherein Z is an oxygen atom or a sulfur atom, Q is an oxygen atom, a sulfur atom or —NH—, $R^1$ is a hydrogen atom, a $C_1$–$C_4$ alkyl group, an alkenyl group, an alkoxyl group, a benzyl group or an aryl group, which may be substituted, and a is 0–2.

1 Claim, No Drawings

POLYANILINE DERIVATIVES AND THEIR PRODUCTION PROCESS

This application is a division of application Ser. No. 08/128,570 filed Sep. 30, 1993 which is a continuation-in-part of application Ser. No. 07/858,058, filed Mar. 26, 1992.

BACKGROUND OF THE INVENTION

1. Field of the Invention

The present invention relates to novel polyaniline derivatives which are soluble or capable of swelling in organic solvents and form a self-standing film, and also to their production process.

2. Description of the Related Art

Investigation has been conducted in recent years with a view toward applying polyanilines as new electronic materials or electroconductive materials in a wide variety of fields such as cell electrode materials, antistatic materials, electromagnetic shielding materials, functional devices— e.g., photoelectric transducers, optical memories and various sensors—, display devices, various hybrid materials, transparent electroconductors, and various terminal equipment.

Polyanilines however have a highly developed $\pi$-conjugated system. They are hence accompanied by the serious drawbacks that they are insoluble in most organic solvents and do not melt even when heated due to having a rigid main chain and the existence of strong interaction and strong hydrogen bonds between polymer chains, and also have poor moldability and permit neither cast molding nor coating.

They are therefore formed, for example, into electroconductive composite materials by impregnating base materials of a desired shape—such as fibers, porous bodies or the like of high-molecular materials—with their corresponding aniline monomers and then bringing the monomers into contact with a suitable polymerization catalyst or subjecting the monomers to electropolymerization to polymerize the monomers. As an alternative, such aniline monomers are polymerized in the presence of powder of a thermoplastic polymer to obtain similar composite materials.

In the meantime, polyanilines soluble in N-methyl-2-pyrrolidone alone has also been synthesized by suitably choosing the polymerization catalyst and reaction temperature [M. Abe et al.: J. Chem. Soc., Chem. Commun., 1989, 1736)]. These polyanilines are however practically insoluble in other general organic solvents so that their application field is limited.

Further, though polyaniline derivative solubles in organic solvents have been produced using various kinds of aniline derivatives, they are impossible to form a film having sufficient elasticity. On the other hand, if a high molecular compound is capable of gelation, it can be processed by means of techniques such as gel stretching, gel spinning or gel molding, etc.

SUMMARY OF THE INVENTION

The present invention has been completed with a view toward overcoming the problems described above.

An object of the present invention is therefore to provide a novel polyaniline derivative which is soluble or capable of swelling in organic solvent and forms an elastic self-standing film. Another object of the present invention is to provide a process for producing the above polyaniline derivative.

As a result of earnest investigation with a view toward overcoming the above problems, the present inventor has found that the polyaniline derivative which is soluble of capable or swelling in organic solvent and forms an elastic self-standing film can be easily produced by reacting a reduced polyaniline with a compound having functional groups in its terminals capable of reacting with secondary amino groups of the reduced polyaniline, leading to the completion of the present invention.

Each polyantline derivative according to the present invention is a novel polymer, which substantially comprises a polyantline having a number average molecular weight in a range of from 2,000 to 500,000 represented by the following formula (I) as the main polymer chain:

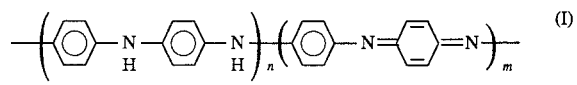

wherein m and n are 0 or an integer of at least 1, m/(m+n)=0–1, and m+n=10–5,000, and cross-linking units represented by the following formula (II)

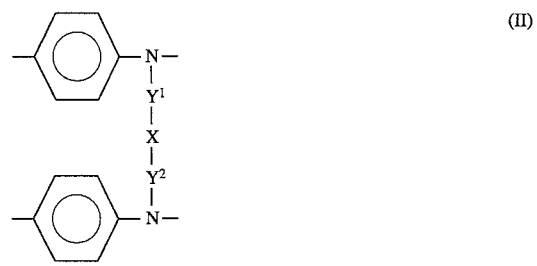

wherein X is a direct bond, a substituted or unsubstituted divalent $C_1$–$C_{30}$ aliphatic hydrocarbon group, a substituted or unsubstituted divalent aromatic hydrocarbon group, a divalent polysiloxane group or group derived therefrom, or a divalent group of a compound having 2 or more repeating structural units, $Y^1$ and $Y^2$ which may be identical or different denote each a direct bond, $$-CO-, \ -C(=Z)NH-, \ -SO_a-,$$

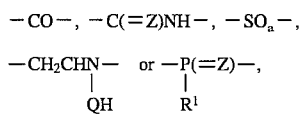

wherein Z is an oxygen atom or a sulfur atom, Q is an oxygen atom, a sulfur atom or —NH—, R' is a hydrogen atom, a $C_1$–$C_4$ alkyl group, an alkenyl group, an alkoxyl group, a benzyl group or an aryl group which may be substituted, and a is 0–2.

The above polyaniline derivative of the present invention can be produced the process which comprises treating a polyaniline with ammonia to convert the polyaniline to a soluble polyaniline, treating the soluble polyaniline with excess hydrazine to convert the soluble polyaniline to a reduced polyaniline having a number average molecular weight of from 2,000 to 500,000, which is represented by the formula (III):

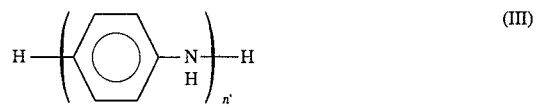

wherein n' is an integer of 10–5000, and reacting said reduced polyaniline with a compound represented by the following formula (IV) which has functional groups capable of reacting with secondary amino group in both terminals.

wherein $X^2$ represents a direct bond, a substituted or unsubstituted di- or polyvalent $C_1$-$C_{30}$ aliphatic hydrocarbon group, a substituted or unsubstituted di- or polyvalent aromatic hydrocarbon group, a divalent polyslloxane group or group derived therefrom, or a divalent group derived from a compound having 2 or more repeating units, and $Y^{1'}$ and $Y^{2'}$ which may be identical or different are each a halogen atom or a group selected from $$Z^1-CO-, ZCN-, Z^2-SO_a-,$$

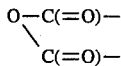 or $Z^3-P(=Z)-,$
                              $|$
                              $R^1$ and

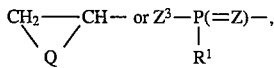

wherein Z is an oxygen atom or a sulfur atom, Q is an oxygen atom, a sulfur atom or —NH—, $R^1$ is a hydrogen atom, a $C_1$-$C_4$ alkyl group, an alkenyl group, an alkoxyl group, a benzyl group or an aryl group which may be substituted, $Z^1$ is OH, Cl, Br or I, $Z^2$ is Cl, Br or I and a is 0–2.

DETAILED DESCRIPTION OF PREFERRED EMBODIMENTS

The present invention will hereinafter be described in detail.

Described in more detail, the polyaniline derivatives of the present invention are produced as follows. A polyaniline produced by oxidative polymerization of aniline at a low temperature, for example, in a range of $-20°$–$50°$ C. in the presence of an oxidizing agent such as ammonium persulfate, is treated with ammonia to obtain a soluble polyaniline. The soluble polyaniline is then treated with excess hydrazine to convert it to a reduced polyaniline having a number average molecular weight of from 2,000 to 500,000 (as measured by GPC in N-methyl-2-pyrrolidone as a solvent and converted relative to polystyrene). The term "reduced polyaniline" means a reduced product of the above polyaniline as obtained by the oxidative polymerization, said reduced product containing a hydrogen atom bonded to each of all nitrogen atoms contained in the polyaniline. The hydrazine treatment can be effected by dispersing the soluble polyaniline in water, adding hydrazine in an amount at least equivalent to, preferably three times the nitrogen atoms in the polyaniline under a nitrogen atmosphere and then stirring the resultant mixture at $0°$–$30°$ C. for 24 hours.

The reduced polyaniline thus obtained is soluble in N-methyl-2-pyrrolidone or N,N-dimethylacetamide but is practically insoluble in other general organic solvents, for example, chloroform and tetrahydrofuran.

The reduced polyaniline is then cross-linked by reacting with a compound represented by the formula (IV) which has functional groups ($Y^{1'}$ and $Y^{2'}$) in its terminals which are capable of reacting with secondary amino groups of the reduced polyaniline.

$$Y^{1'}-X^2-Y^{2'} \quad (IV)$$

wherein $Y^{1'}$, $X^2$ and $Y^{2'}$ are the same meanings as defined above.

The cross-linking reaction of the reduced polyaniline depends upon the kind of functional group of the compound represented by the formula (IV). In the following, reactions based on each functional group are described in detail respectively. Synthetic process 1 ($Y^{1'}$ and $Y^{2'}$ in the formula (IV) are each a halogen atom,

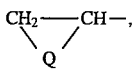

or

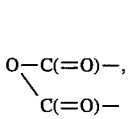

wherein Q is the same meaning as defined above.)

Into a solution of the reduced polyaniline in an amide solvent, a compound having the above described functional groups in its terminal is added, followed by stirring at $0°$–$80°$ C. for 1–48 hours under a nitrogen atmosphere. The reaction may be conducted, if necessary, by adding pyridine or a tertiary amine such as triethylamine or diethylaniline, etc. The reaction mixture is poured into alcohol or water to precipitate the resulted polymer. The resultant polymer is further treated with aqueous ammonia to produce a polyaniline derivative of this invention.

Synthetic process 2 ($Y^{1'}$ and $Y^{2'}$ in the formula (IV) are each $Z^4 C(=O)-$, $ZCN-$, $Z^2SO_a-$, wherein $Z^4$ denotes Cl, Br, I, and $Z^2$ and a are the same meaning as defined above.)

Into a solution of the reduced polyaniline in an amide solvent, a solution of a high molecular compound having the above described groups in its terminals in an amide, ether or ester solvent is slowly added, followed by stirring at $-10°$–$80°$ C. for 1–48 hours under a nitrogen atmosphere. The reaction may be conducted, if necessary, by adding pyridine or a tertiary amine such as triethylamine or diethylaniline, etc. The reaction mixture is poured into alcohol or water to precipitate the resulted polymer. The resultant polymer is further treated with aqueous ammonia to produce a polyaniline derivative of this invention.

Synthetic process 3 ($Y^{1'}$ and $Y^{2'}$ in the formula (IV) are each $HOC(=O)-$)

To a compound having terminal carboxyl groups, a N,N'-disubstituted carbodiimide is added in an amount of at least equivalent to the terminal carboxyl groups with chilling at $-10°$–$10°$ C., followed by stirring at the same temperature for 1–4 hours. Into the solution, the reduced polyaniline in an amide solvent is slowly added. The mixture is further stirred for 1–48 hours while the temperature is slowly raised to room temperature. The reaction mixture is poured into alcohol or water to precipitate the resulted polymer. The resultant polymer is further treated with aqueous ammonia to produce a polyaniline derivative of this invention.

N,N'-disubstituted carbodiimides used in this process are represented by the following formula (V).

$$R'-N=C=N-R'' \quad (V)$$

wherein R' and R" which may be identical or different denote each an alkyl group such as methyl group, ethyl group, n-propyl group, i-propyl group, n-butyl group, t-butyl group, 3-dimethylaminopropyl group, etc., a cycloalkyl group such as cyclohexyl group, or an aryl group such as phenyl group, p-tolyl group, m-tolyl group, p-N,N-dimethylaminophenyl group, p-chlorophenyl group, p-nitrophenyl group or p-cyanophenyl group, etc.

Examples of N,N'-disubstituted carbodiimides include diethylcarbodiimide, diisopropylcarbodiimide, dicyclohexylcarbodiimide, diphenylcarbodiimide, di-p-tolylcarbodiimide, 1-ethyl-3-(3-dimethylaminopropyl)carbodiimide and the like.

Alternatively, the polyaniline derivative of the present invention can be produced according to the synthetic process 2 after converting the terminal carboxyl groups into haloformyl groups. The conversion of the terminals carboxyl group to haloformyl group can be carried out using dicarboxylic acids represented by the formula (IV), esters thereof (methyl or ethyl ester) or salts thereof (alkali metal salt or ammonium salt, etc.) according to the following processes.

A high molecular compound having haloformyl groups in its terminals can be produced by adding at least equivalent of an inorganic halide such as phosphoryl chloride, thionyl chloride, phosphorus pentachloride and the like and reacting in an inert solvent such as benzene. In this case, it is possible to use a catalyst such as zinc chloride, pyridine, iodine, trlethylamine, etc. Alternatively, the high molecular compound having haloformyl groups in its terminals can be produced by reacting the dicarboxylic acid with an organic halide such as an acid halide, for example, benzoyl chloride, phthaloyl chloride, oxalyl chloride, an α,α-dihalogenoether, a halogenated alkylamine or an organic phosphorus halide, for example, toriphenylphosphine, carbon tetrachloride, pyrocatechyl phosphotrichloride, dichloroethyl phosphine, triphenylphosphine dibromlde etc. in an inert solvent such as benzene or chlorobenzene, etc.

The high molecular compound having haloformyl groups in its both terminals can be obtained from dicarboxylic acid esters by treating with a trlphenyl phosphohalide or a boron fluoride complex thereof.

The high molecular compound having haloformyl groups in its both terminals can also be obtained from dicarboxylic acid salts by treating with an inorganic halogen compound such as phosphoryl chloride or phosphorus pentachloride, or a complex of thionyl chloride and dimethylformamide.

In addition to them, it is possible to utilize other reactions in order to produce the high molecular compound having haloformyl groups in its both terminals, if the carboxyl groups can be converted to haloformyl groups.

In the compound having functional groups capable of reacting with secondary amino groups in its terminals represented by the formula (III), $X^2$ is direct bond, a substituted or unsubstituted di- or polyvalent $C_1$–$C_{30}$ aliphatic hydrocarbon group, a substituted or unsubstituted di- or polyvalent aromatic hydrocarbon group, a divalent oxyalkylene group, a divalent polysiloxane group, or a divalent group derived from compound having 2 or more repeating unit.

Exemplary, the divalent $C_1$–$C_{30}$ aliphatic hydrocarbon group and divalent aromatic hydrocarbon group include methylene, ethylene, propylene, tetramethylene, octamethylene, ethyl ethylene, vinylene, propenylene, 4-propyl-2-pentenylene, o-phenylene, m-phenylene, p-phenylene, 2-methoxy-1,4-phenylene, biphenylene, divalent groups which are derived from toluene by removing two hydrogen atoms of α-, 2-, 3- and 4-positions.

Examples of the polyvalent aromatic or aliphatic hydrocarbon groups include 4-valent groups represented the following formulas (a)–(h)

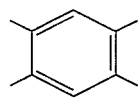
(a)

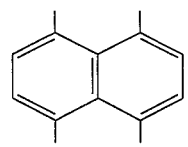
(b)

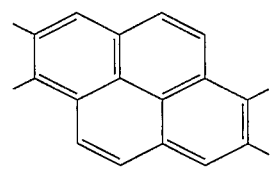
(c)

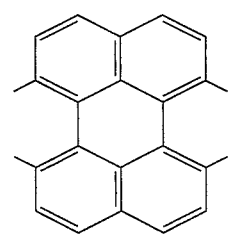
(d)

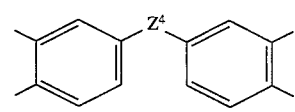
(e)

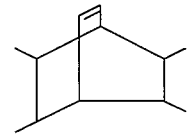
(f)

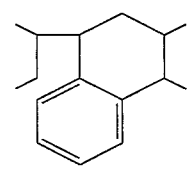
(g)

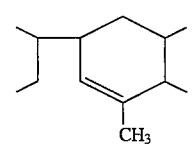
(h)

wherein $Z^4$ is a direct bond, —CO—, —SO$_2$—, —O—, —CH$_2$—, —(CF$_3$)$_2$, —COOCH$_2$CH$_2$OCO— or —OArO—, wherein Ar is a divalent aromatic group.

In the case that $X^2$ is a polyvalent group including the above described 4-valent group, the formula (II) in the resultant polyaniline derivative is shown as the following (VI).

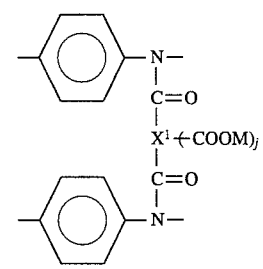
(VI)

wherein $X^1$ is a 3- or more valent monocyclic or polycyclic aromatic hydrocarbon group or a 3-or more valent monocyclic or polycyclic aliphatic hydrocarbon group, M is an alkali metal or a hydrogen atom, and j is an integer of 1–2.

Examples of oxyalkylene group include methyleneoxy, ethyleneoxy, methylenedioxy, ethylenedioxy and trimethylenedioxy group.

Examples of polysiloxane group include dimethyldiphenyl disiloxane group and tetramethyl disiloxane group.

Examples of divalent groups of a compound having 2 or more repeating units include those of polyolefins (including vinyl polymers, diene polymers, etc.) polyacetals, polyethers, polythioethers, polysulfones, polyesters, polyamides, polysulfonamides, polyimides, polyurethanes, polyureas, polythiosemicarbazides, polyphosphazenes, and copolymers of monomers composing the above described polymers.

Examples of polyolefins include polyethylene, polypropylene, polystyrene, polyisobutylene, 1,4-polybutadiene and hydrogenated product thereof, 1,2-polybutadiene and hydrogenated product thereof, polychloroprene, polyacrylic acid and esters thereof such as methyl, ethyl or n-butyl esters, polymethacrylic acid and esters thereof such as methyl, ethyl or n-butyl esters, polyacrylonitrlle, polyvinyl alcohol, polyvinyl acetate, polyvinyl chloride, polyvinylidene fluoride, polytetrafluoroethylene, polyvinyl butyral, polyvlnylpyrldine, polyvinyl pyrrolidone, etc.

Illustrative polyacetals include formaldehyde homopolymer, copolymers of trloxane and 1,3-dioxirane or ethylene oxide prepared by cationic ring-cleavage copolymerization.

Examples of polyether polymers include poly(oxymethylene), poly(ethylene oxide), poly(oxytrimethylene), poly(propylene oxide), poly(butyrene oxide), poly(phenylene oxide) and epoxy resins.

Examples of polythioethers include poly(phenylene sulfide), poly(methylthiiran) and polythiethane.

Exemplary polysulfones include poly(phenoxyphenylsulfone) and the like.

Examples of polyesters include poly(oxytetramethylene oxysebacoyl), poly(ethyleneterephthalate), poly(butyrene terephthalate), polycarbonates, —[C(═O)(CH$_2$)$_6$—C(CH$_3$)═CH—(CH$_2$)$_2$—CH═C(CH$_3$)—(CH$_2$)$_6$—C(═O)O]$_r$— and —[C(═O)(CH$_2$)$_6$—CH(CH$_3$)—(CH$_2$)$_4$—CH(CH$_3$)—(CH$_2$)$_6$—C(═O)O]$_r$— wherein r is an integer.

Examples of polyamides include poly(hexamethylene adipamide) (nylon 66), nylon 64, nylon 610, poly-ε-caprolactam (nylone 6), nylon 11, nylon 12, etc.

Illustrative, polysulfonamides include poly(hexamethylene-1,3-benzenesulfonamide), etc.

Examples of polyimides include polycondensates of pyromellitic anhydride and diamines such as tetramethylenediamine, hexamethylenediamine or octamethylenediamine, etc.

Exemplary polyurethanes include a polyaddition product of hexamethylenediisocyanate and butane diol, a polyaddition product of tolylenediisocyanate and poly(ethylene oxide).

Examples of polyureas include polyaddition products of diisocyanates such as hexamethylenediisocyanate, methylenebis(4-phenylisocyanate), xylylenediisocyanate, tolylenediisocyanate, 3-isocyanatomethyl-3,3,3-trimethylcyclohexylisocyanate, etc. and diamines such as ethylenediamine, trans-2,5-dimethylpiperazine, etc.

Exemplary polythiosemicarbazides include a polyaddition product of methylenebis(4-phenyllsothiocyanate) and N,N'-diaminopiperazine and the like.

Examples of polysiloxanes include poly(dimethylsiloxane), poly(methylphenylsiloxane) and poly(diphenylsiloxane).

Examples of polyphosphazenes include poly(dialkylphosphazenes) and poly(dialkoxyphosphazenes).

Illustrative copolymers of monomers composing the above described polymers include acrylonitrile-butadiene copolymer, acrylonitrile-butadiene-styrene copolymer, acrylonitrile-methyl methacrylate copolymer, acrylonitrlle-styrene-methyl acrylate copolymer, acrylonitrile-styrene-methyl methacrylate copolymer, ethylene-ethyl acrylate copolymer, ethylene-propylene copolymer, ethylene-vinyl acetate copolymer, perfluoroethylene-perfluoropropylene copolymer, styrenebutadiene copolymer, styrene-α-methylstyrene copolymer, vinyl chloride-ethylene copolymer, vinyl chloride-ethylene-methyl methacrylate copolymer, vinyl chloride-ethylene-vinyl acetate copolymer, vinyl chloride-ethylene-methyl acrylate copolymer, styrenemaleic anhydride copolymer and phthalic anhydrideethylene oxide-tetrahidorofuran copolymer.

The high molecular compounds having functional groups $Y^{1'}$ and $Y^{2'}$ in their terminals which are capable of reacting with secondary amino group of the reduced polyaniline, which are represented by the formula (IV), can be synthesized as follows.

The polyesters and polyamides having carboxyl groups in their both terminals can be synthesized by polymerization of a diol or a diamine and a dicarboxylic acid using an excess amount of the dicarboxyllc acid or by adding the dicarboxylic acid in the course of the polymerization.

The polyurethanes and polyureas having isocyanate groups in both terminals can be produced by polymerization of a diisocyanate and a diol component or diamine using an excess amount of the diisocyanate, or adding the diisocyanate in the course of the polymerization.

In vinyl polymers capable of living anionic polymerization, it is possible to introduce terminal groups by reacting the living polymer with, for example, carbon dioxide to produce carboxyl groups in the terminals, phosgene to produce acyl chloride groups in the terminals, diisocyanate to introduce isocyanate groups or diepoxide to introduce epoxy groups into the terminals.

Polyolefins having carboxyl groups in the terminals can be synthesized by hydrolyzing a copolymer of ethylene carbonate and a vinyl monomer such as styrene or the like and oxidizing the resulted diol with permanganic acid to cleave the chain.

High molecular compounds having epoxy groups in their terminals can be synthesized by reacting a polyether or polyester having hydroxyl groups in both terminals with epihalohydrin. Also, high molecular weight compounds having an acid anhydride sturucture in both terminals can be obtained by reacting with trimellitic anhydride.

High molecular compounds having epoxy groups in both terminals can be synthesized by reacting a polyether or polyester having carboxyl groups in both terminals with glycidyl alcohol.

Polysiloxanes having carboxyl groups in both terminals can be easily produced by reacting a disiloxane having carboxyl groups in both terminals with siloxane trimer or siloxane tetramer.

Usable examples of the compounds having functional groups $Y^{1'}$ and $Y^{2'}$ in their terminals which are capable of reacting with secondary amino group of the reduced polyaniline, which are represented by the formula (IV), include the following compounds.

Dicarboxylic acids such as oxalic acid, malonic acid, succinic acid, glutaric acid, adipic acid, suberic acid, sebacic acid, eicosanedioic acid, maleic acid, fumaric acid, isophthalic acid, terephthalic acid, tetrabromophthalic acid, and acid halides of the above described dicarboxylic acids.

Diisocyanates such as tetramethylene diisocyanate, hexamethylene diisocyanate, octamethylene diisocyanate, m-phenylene diisocyanate, p-phenylene diisocyanate, toluene-2,4-diisocyanate, o-tolidine diisocyanate, m-xylylene diisocyanate, 3,3'-dimethylbiphenyl-4,4'-diisocyanate, 3,3'-dimethyldiphenylmethane-4,4'-diisocyanate, 3,3'-dichlorodiphenyl-4,4'-diisocyanate and the like, and diisothiocyanates in which the oxygen atom in the isocyanate group of the above described diisocyanates is changed for a sulfur atom.

Disulfonyl halides such as o-benzenedisulfonyl dichloride, m-benzenedisulfonyl dichloride, p-benzenedisulfonyl dichloride, 2,4-toluenedisulfonyl dichloride, 2,3-toluenedisulfonyl dichloride, etc. and disulfenyl halides and disulfinyl halides which are derived by reducing the sulfonyl groups of the above described disulfonyl halides.

Diepoxides such as ethylene glycol diglycidyl ether, 1,4-butanediol diglycidyl ether, neopentyl glycol diglycldyl ether, 1,6-hexanediol glycidyl ether, 1,7-octadienediepoxide, 2,2-bis[4-(2,3-epoxypropoxy)phenyl]-epoxypropoxy)phenyl]-diglycidyl ether and the like.

Compounds having carboxylic acid anhydride structures in both terminals, such as ethylene glycol trimellitic dianhydride ester, 1,4-butanediol trimellitic dianhydride ester, neopentyl glycol trimellitic dianhydride ester, 1,6-hexanediol trimellitic dianhydride ester, and the like.

Tetracarboxylic acid dianhydrides such as pyromellitic dianhydride, 3,3',4,4'-benzophenonetetracarboxylic dianhydride, 3,3',4,4'-diphenylsulfonetetracarboxylic dianhydride, 1,3,3a,4,5,9b-hexahydro-5-(tetrahydro-2,5-dioxo-3-furanyl)naphtho[1,2-c]furan-1,3-dione and 4,4'-oxydiphthalic anhydride.

Compounds having different functional groups in both terminal ends such as ε-isocyanate hexanoyl chloride, 11-isocyanato undecanoyl chloride, 3-chlorocarbonyloxypropionyl chloride, 3-chlorocarbonyloxy-1-isocyanato propane, 2-isocyanato ethane sulfonyl chloride, 1-chlorocarbonyloxy-2-isocyanato ethane, 4-isocyanato benzenesulfonyl chloride, etc. These compounds can be easily synthesized by reacting the following compounds with phosgene. Namely, Compounds having an isocyanate group and a chloroformyl group are synthesized using compounds having an amino group and a carboxyl group (for example, p-aminobenzoic acid, m-aminobenzoic acid, o-aminobenzoic acid, p-aminophenylacetic acid, m-aminophenylacetic acid, o-aminophenylacetic acid, 5-aminovaleric acid, 6-aminohexanoic acid, 7-aminoheptanoic acid, 11-aminoundecanoic acid, 12-aminododecanoic acid, etc.). Compounds having a chloroformate group and a chloroformyl group are synthesized using compounds having a hydroxyl group or a carboxyl group (for example, hydroxyacetic acid, p-hydroxybenzoic acid, m-hydroxybenzoic acid, o-hydroxybenzoic acid, 16-hydroxyhexadenanoic acid, etc.). Compounds having a chloroformate group and an isocyanate group are synthesized using compounds having a hydroxyl group and an amino group (o-aminobenzyl alcohol, m-aminobenzyl alcohol, p-aminobenzyl alcohol, 2-aminoethanol, 2-(2-aminoethoxy)ethanol, 5-amino-1-pentanol, p-aminophenetyl alchol, m-aminophenetyl alcohol, o-aminophenetyl alchol, etc.). Compounds having an isocyanate group and a sulfonyl chloride group are synthesized using compounds having an amino group and a sulfonic acid group (for example, p-aminobenzenesulfonic acid, m-aminobenzene sulfonic acid, o-aminobenzenesulfonic acid, 2-aminoethane-1-sulfonic acid, etc.). Compounds having an isocyanate group and a sulfonyl chloride group are synthesized using compounds having a hydroxyl group and a sulfonic acid group (for example, p-hydroxybenzene-hydroxybenzene-m-hydroxybenzenesulfonic acid or o-hydroxybenzenesulfonic acid.)

TP-1001 (1,2-polybutadiene having isocyanate groups in both terminals; molecular weight of about 1000; produced by Nippon Soda Co.), Hycar CTB(1,4-polybutadiene having carboxyl groups in both terminals: molecular weight of about 3600; produced by Goodrich Co.), Hycar CTBN (copoly(butadiene/acrylonitrile) having carboxyl groups in both terminals composed of 10, 17 and 27% by mol of acrylonitrile component; molecular weight of about 3600; produced by Goodrich Co.), CI-1000 (hydrogenated polybutadiene having carboxyl group in both terminals; MW=about 1000, 2000, 3000, 4000;

produced by Nippon Soda Co.), IPU-22A
(HO—[C(=O)(CH$_2$)$_6$—C(CH$_3$)=CH—(CH$_2$)$_2$—
CH=C(CH$_3$)—(CH$_2$)$_6$—C(=O)O]$_r$—H;

r=3–4, produced by Okamura Seiyu K.K.), IPS-22AH
(HO—[C(=O)(CH$_2$)$_6$—CH(CH$_3$)—(CH$_2$)$_4$—
CH(CH$_3$)—(CH$_2$)$_6$—C(=O)O]$_r$—H;

r=3–4, produced by Okamura Seiyu K.K.), IPU-22G (glycidyl ester of IPU-22AH; produced by Okamura Seiyu K.K.), polyethyleneoxide diglycolic acid (molecular weight of about 1000, 3000 and 5000; produced by Kawaken Fine Chemical Co.), Rikaresin BPO-20E (bisphenol A having glycidyl propylene oxide group in both terminals; produced by Shin-Nippon Rika K.K.), TSF4770 (poly(dimethylsiloxane) having carboxyl group in both terminals; melocular weight of about 2500 and 8000; produced by Toshiba Silicone Co.), TSL9946(α,ω-bis(3-glycidoxypropyl)poly-(dimethylsiloxane); molecular weight of about 660; produced by Toshiba Silicone Co.), TSL9986(α,ω-bis(3-glycidoxypropyl)poly(dimethylsiloxane); molecular weight of about 960; produced by Toshiba Silicone Co.), etc.

It is a characteristic of the present invention that straight polymer chains of the polyaniline are cross-linked at suitable intervals by means of various kinds of cross-linking agents as described above. The usable cross-linking agents include various compounds including from lower molecular compounds to higher molecular compounds. A film of the resultant cross-linked polyaniline of the present invention is rich in elasticity and shows a high conductivity after having been doped. Although the conductivity tends to reduction when the amount of the cross-linking agent used is large to the extreme degree, it is not influenced so much by the kind of cross-linking agents. Accordingly, the cross-linking agent can be chosen from various kinds of materials.

In the polyaniline derivative of the present invention, since the main polymer chain of polyaniline does not change in length during the production process, the value of 2(m+n) is equal to the value of n' of the reduced polyaniline used as the starting material. Further, the value of m/(m+n) can be controlled by oxidation or reduction of the resultant polyaniline derivative of the present invention. Namely, the value of m increases by oxidizing the polyaniline derivative of the present invention by means of an oxidizing agent or electrochemically, while it decreases by reducing with a reducing agent or electrochemically. The value of m/(n+m) can be determined by measuring $^{13}$C NMR spectra and calculating a ratio of a peak strength originated from quinoid structure (chemical shift: 138 ppm/TMS) to a peak strength originated from benzenoid structure (chemical shift: 122 ppm/TMS).

Usable examples of amide solvents include N-methyl-2-pyrrolidone, N,N-dimethylacetamide, N,N-dimethylformamide, hexamethylphosphoric triamide and 1,3-dimethyl-2-imidazolidinone.

In the polyaniline derivatives of the present invention, it is preferred that number of nitrogen atoms to which the cross-linking group represented by the formula (II) is attached is in a range of 0.01–40% of nitrogen atoms contained in the polyaniline derivative. If the number of nitrogen atoms concerning cross-linking is higher than 40%, the polyaniline derivative become difficult to dissolve or swell in organic solvents to cause problems in processability. If it is lower than 0.01%, solubility is hardly different from polyaniline.

The polyaniline derivatives of the present invention produced as described above are capable of dissolving or swelling in polar solvents, for example, amide solvents such as N-methyl-2-pyrrolidone, N,N-dimethylacetamide and the like, halogenated hydrocarbon solvents such as chloroform, dichloroethane, dichloromethane and the like, ether solvents such as tetrahydrofuran and the like, amine solvents such as pyridine, and dimethylsulfoxide and the like. From the solution or gel, self-standing films or fibers can be produced. The resultant films or fibers show a conductivity as high as $10^{-3}$–10 S/cm after having been doped with an acceptor dopant.

Any dopant can be use if it can be used for producing conductive aniline polymers by doping. Examples of the dopant include iodine, bromine, chlorine, protonic acid such as sulfuric acid, hydrochloric acid, nitric acid, perchloric acid, fluoroboric acid and salts of said protonic acids, Lewis acids such as aluminium trichloride, ferric trichloride, molybdenum chloride, antimony chloride, arsenic pentachloride, etc., organic acids such as acetic acid, trifluoroacetic acid, benzenesulfonic acid, p-toluenesulfonic acid, etc., high polymer acids such as poly(ethylene sulfonic acid), polyethylene carbonic acid, polyacryic acid, polystyrene sulfonic acid, etc.

Any know method can be used for doping with the above described compounds. In general, doping can be conducted by bringing the polyaniline derivative, gelatinized or molded products thereof in contact with the dopant in an acid or liquid phase. Alternatively, it is possible to use a method of electrochemically doping with the above described protonic acids or salts thereof in a solution.

The polyaniline derivatives of this invention are soluble or capable of swelling in various organic solvents, thereby elastic self-standing films or fibers being formed easily. Further, they may be utilized for various uses such as electronic materials, conductive materials and the like because of showing a high conductivity by doping.

EXAMPLES

The present invention will hereinafter be described by following examples.

Example 1

(1) Production of reduced polyaniline 4.1 g of aniline and 21.9 g of concentrated hydrochloric acid were dissolved in water to give 100 ml of an aniline solution. The aniline solution was chilled to −5° C. 21.9 g of concentrated hydrochloric acid and 6.28 g of ammonium persulfate were also dissolved in water to give 100 ml of a solution. The latter solution was also chilled to −10° C. and was then slowly added dropwise to the aniline solution, followed by stirring at −10° C. for 6 hours. The thus obtained polyaniline having a number average molecular weight of 12,000 (as measured by GPC in N-methyl-2-pyrrolidone as a solvent and converted relative to polystyrene) was washed thoroughly with water, followed by undoping treatment with aqueous ammonia.

The resulting soluble polyaniline was dispersed in 200 ml of water, followed by the addition of 50 ml of hydrazine in a nitrogen atmosphere. The mixture thus obtained was continuously stirred for 24 hours at room temperature.

The resultant solid precipitate was collected by filtration and then dried, whereby a reduced polyaniline of a grayish white color (number average molecular weight of 12,000; n'=about 130) was obtained.

(2) Cross-linking of reduced polyaniline

Into 30 ml of N-methyl-2-pyrrolidone was added 1 g of the resultant reduced polyaniline to completely dissolve under a nitrogen atmosphere. To the resultant solution was added a solution prepared by completely dissolving 0.045 g (2% by mol to aniline units) of lsophthaloyl chloride, and the resultant mixture was stirred for 6 hours so that they were reacted. The reaction mixture was poured into 1 liter of water while the resulting mixture was stirred. The resulting precipitate was collected by filtration, dried and then subjected to undoping treatment with aqueous ammonia, whereby a cross-linked polyaniline derivative with amidated nitrogen atoms was obtained in an amount of 1.03 g.

When the resultant cross-linked polyaniline derivative was analyzed by infrared absorption spectroscopy, an absorption at 1660 cm$^{-3}$ assigned to the structure represented by the above formula (II) was observed, and absorptions at 1600, 1500, 1300, 1170 and 820 cm$^{-3}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 2% of the total number of nitrogen atoms contained in the polyaniline chains. $^{13}$C NMR spectrum revealed m/(n+m)=0.49.

The cross-linked polyaniline derivative gelled by stirring 1 g thereof in 10 g of N-methyl-2-pyrrolidone at room temperature. From the resultant gel, a film was obtained by spinning or extrusion. Its conductivity was 1.5 S/cm after having been doped by immersing it in a 20% aqueous solution of hydrochloric acid for 24 hours.

The cross-linked polyaniline derivative also gelled in organic solvents such as N,N-dimethylacetamide, N,N-dimethylformamide, pyridine, chloroform, dichloroethane, dlchloromethane and tetrahydrofuran, in addition to N-methyl-2-pyrrolidone.

Example 2

A cross-linked polyaniline derivative was produced in an amount of 1.15 g in a similar manner to Example 1 except that sebacoyl chloride (0.45 g) (10% by mol to nitrogen atoms of polyaniline) was used instead of isophthaloyl chloride in Example 1. Amidation was confirmed by an absorption at 1660cm$^{-1}$ in the infrared absorption spectrum. An absorption assigned to a methylene chain of the cross-linking structure was observed at about 2950 cm$^{-1}$. From the yield of the reaction, the cross-linking structure was found to be about 8% to total number of aniline units.

When a film of the resultant cross-linked pelyanlline derivative was produced in a similar manner to Example 1, its conductivity was 0.01 S/cm after having been doped in the same manner as in Example 1.

The cross-linked polyaniline derivative also gelled in the same organic solvents as in Example 1.

Example 3

A cross-linked polyaniline derivative was produced in an amount of 1.05 g in a similar manner to Example 1 except that fumaroyl chloride (0.17 g) (10% by mol to nitrogen atoms of polyaniline) was used instead of isophthaloyl chloride in Example 1. Amidation was confirmed by an absorption at 1660 cm$^{-1}$ in the infrared absorption spectrum. An absorption by a methylene chain of the cross-linking structure was observed at about 2950 cm$^{-1}$. From the yield of the reaction, the cross-linking structure was found to be about 5% to total number of aniline units.

When a film of the resultant cross-linked polyaniline derivative was produced in a similar manner to Example 1, its conductivity was 0.01 S/cm after having been doped in the same manner as in Example 1.

The cross-linked polyaniline derivative also gelled in the same organic solvents as in Example 1.

Example 4

A cross-linked polyaniline derivative with carbamoylated nitrogen atoms was produced in an amount of 1.332 g in a similar manner to Example 1 except that hexamethylene diisocyanate (0.369 g) (20% by mol to nitrogen atoms of polyaniline) was used instead of isophthaloyl chloride in Example 1.

When the resultant cross-linked polyaniline derivative was analyzed by infrared absorption spectroscopy, an absorption at 1650 cm$^{-1}$ (C=O stretching) assigned to the structure represented by the above formula (II) was observed, and absorptions at 1600, 1500, 1300, 1170 and 820cm$^{-1}$ assigned to the polyaniline structure represented by the general formula (I) were observed, whereby the cross-linked polyaniline derivative was observed at about 2950 cm$^{-1}$, whereby the main polymer chain of the cross-linked polyaniline derivative was comfirmed to have a polyaniline structure. From the yield of the reaction, the cross-linking structure was found to be about 18% to total number of aniline units. $^{13}$C NMR spectrum revealed m/(n+m)=0.41.

The cross-linked polyaniline derivative was gelled by stirring 1 g thereof in 10 g of N-methyl-2-pyrrolidone at room temperature. From the resultant gel, a film was obtained by spinning or extrusion. Its conductivity was 0.01 S/cm after having been doped by immersing it in a 20% aqueous solution of hydrochloric acid for 24 hours.

The cross-linked polyaniline derivative was also gelled in the same organic solvents as in Example 1.

Example 5

A cross-linked polyanlline derivative was produced in an amount of 1.145 g in a similar manner to Example 1 except that m-xylylenediisocyanate (0.207 g) (10% by mol to nitrogen atoms of polyaniline) was used instead of isophthaloyl chloride in Example 1. Carbamoylation was confirmed by an absorption at 1650 cm$^{-1}$ in the infrared absorption spectrum. From the yield of the reaction, the cross-linking structure was found to be about 7% to total number of aniline units.

When a film of the resultant cross-linked polyaniline derivative was produced in a similar manner to Example 1, its conductivity was 0.05 S/cm after having been doped in the same manner as in Example 1.

The cross-linked polyaniline derivative was also gelled in the same organic solvents as in Example 1.

Example 6

A cross-linked polyaniline derivative was produced in an amount of 1.096 g in a similar manner to Example 1 except that toluene-2,4-diisocyanate (0.191 g) (10% by mol to nitrogen atoms of polyaniline) was used instead of isophthaloyl chloride in Example 1. Carbamoylation was confirmed by an absorption at 1650 cm$^{-1}$ in the infrared absorption spectrum. From the yield of the reaction, the cross-linking structure was found to be about 5% to total number of aniline units.

When a film of the resultant cross-linked polyaniline derivative was produced in a similar manner to Example 1, its conductivity was 0.01 S/cm after having been doped in the same manner as in Example 1.

The cross-linked polyaniline derivative was also gelled in the same organic solvents as in Example 1.

Example 7

A cross-linked polyaniline derivative was produced in an amount of 1.435 g in a similar manner to Example 1 except that o-tolidinediisocyanate (0.580 g) (20% by mol to nitrogen atoms of polyaniline) was used instead of isophthaloyl chloride in Example 1. Carbamoylation was confirmed by an absorption at 1650 cm$^{-1}$ in the infrared absorption spectrum. From the yield of the reaction, the cross-linking structure was found to be about 15% to total number of aniline units.

When a film of the resultant cross-linked polyaniline derivative was produced in a similar manner to Example 1, its conductivity was 0.03 S/cm after having been doped by immersing it in a 20% aqueous hydrochloric acid solution for 24 hours.

The cross-linked polyaniline derivative was also gelled in the same organic solvents as in Example 1.

Example 8

To 30 ml of N-methyl-2-pyrrolidone was add 1 g of the resultant reduced polyaniline (number average molecular weight 12,000) to completely dissolve under a nitrogen atmosphere. To the resultant solution was added a solution prepared by completely dissolving 0.078 g (5% by mol to aniline units) of 1,7-octadiene diepoxide, and the resultant mixture was stirred for 6 hours so that they were reacted. The reaction mixture was poured into 1 liter of water while the resulting mixture was stirred. The resulting precipitate was collected by filtration and dried, whereby a cross-linked polyaniline derivative with cross-linked nitrogen atoms was obtained in an amount of 1.078 g.

When the resultant cross-linked polyanlline derivative was analyzed by infrared absorption spectroscopy, broad absorptions at about 3300 cm$^{-1}$ (OH stretching) and 2950 cm$^{-1}$ (C—H stretching) assigned to the structure represented by the above formula (II) were observed, and absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 5% of the total number of nitrogen atoms contained in the polyaniline chains. $^{13}$C NMR spectrum revealed m/(n+m)=0.46.

The cross-linked polyaniline derivative was gelled by stirring 1 g thereof in 10 g of N-methyl-2-pyrrolidone at room temperature. From the resultant gel, a film was obtained by spinning or extrusion. Its conductivity was 1.5 S/cm after having been doped by immersing it in a 20% aqueous solution of hydrochloric acid for 24 hours.

The cross-linked polyaniline derivative was also gelled in the same organic solvents as in Example 1.

Example 9

A cross-linked polyaniline derivative was produced in an amount of 1.451 g in a similar manner to Example 8 except that neopentylglycol diglycidyl ether (0.475 g) (20% by mol to nitrogen atoms of polyaniline) was used instead of 1,7-octadiene diepoxide.

When the resultant cross-linked polyaniline derivative was analyzed by infrared absorption spectroscopy, broad absorptions at about 3300 cm$^{-1}$ (OH stretching) and 2950 cm$^{-1}$ (C—H stretching) assigned to the structure represented by the above formula (II) were observed, and absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 19% of the total number of nitrogen atoms contained in the polyaniline chains. $^{13}$C NMR spectrum revealed m/(n+m)=0.41.

When a film of the resultant cross-linked polyaniline derivative was produced in a similar manner to Example 1, its conductivity was 0.01 S/cm after having been doped in the same manner as in Example 1.

The cross-linked polyaniline derivative was also gelled in the same organic solvents as in Example 1.

Example 10

A cross-linked polyaniline derivative was produced in a yield of 1.648 g in a similar manner to Example 8 except that 2,2-bis[3,5-dibromo-4-(2,3-epoxypropoxy)phenyl]propane (0.720 g) (10% by mol to nitrogen atoms of polyaniline) was used instead of 1,7-octadiene diepoxide.

When the resultant cross-linked polyaniline derivative was analyzed by infrared absorption spectroscopy, broad absorptions at about 3300 cm$^{-1}$ (OH stretching) and 2950 cm$^{-1}$ (C—H stretching) assigned to the structure represented by the above formula (II) were observed, and absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 19% of the total number of nitrogen atoms contained in the polyaniline chains. $^{13}$C NMR spectrum revealed m/(n+m)=0.42.

When a film of the resultant cross-linked polyaniline derivative was produced in a similar manner to Example 1, its conductivity was 0.05 S/cm after having been doped in the same manner as in Example 1.

The cross-linked polyaniline derivative was also gelled in the same organic solvents as in Example 1.

Example 11

A cross-linked polyaniline derivative was produced in an amount of 1.172 g in a similar manner to Example 8 except that ethylene glycol diglycidyl ether (0.191 g) (10% by mol to nitrogen atoms of polyaniline) was used instead of 1,7-octadiene diepoxide.

When the resultant cross-linked polyaniline derivative was analyzed by infrared absorption spectroscopy, broad absorptions at about 3300 cm$^{-1}$ (OH stretching) and 2950 cm$^{-1}$ (C—H stretching) assigned to the structure represented by the above formula (II) were observed, and absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 9% of the total number of nitrogen atoms contained in the polyaniline chains.

When a film of the resultant cross-linked polyanlline derivative was produced in a similar manner to Example 1, its conductivity was 0.5 S/cm after having been doped in the same manner as in Example 1.

The cross-linked polyaniline derivative was also gelled in the same organic solvents as in Example 1.

Example 12

A cross-linked polyaniline derivative was produced in a yield of 1.187 g in a similar manner to Example 8 except that 2,2-bis[4-(2,3-epoxypropoxy)phenyl]propane (0.187 g) (5% by mol to nitrogen atoms of polyaniline) was used instead of 1,7-octadiene diepoxide.

When the resultant cross-linked polyaniline derivative was analyzed by infrared absorption spectroscopy, broad absorptions at about 3300 cm$^{-1}$ (OH stretching) and 2950 cm$^{-1}$ (C—H stretching) assigned to the structure represented by the above formula (II) were observed, and absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 5% of the total number of nitrogen atoms contained in the polyaniline chains.

When a film of the resultant cross-linked polyaniline derivatives was produced in a similar manner to Example 1, its conductivity was 0.1 S/cm after having been doped in the same manner as in Example 1.

The cross-linked polyaniline derivative was also gelled in the same organic solvents as in Example 1.

Example 13

A solution was prepared by completely dissolving 1 g of a reduced polyaniline (number average molecular weight 12,000) in 30 ml of N-methyl-2-pyrrolidone under a nitrogen atmosphere. To the resultant solution was added a solution prepared by completely dissolving 0.550 g (5% by mol to aniline units) of a 50 wt. % solution of poly(1,2-butadiene) in butyl acetate [TP-1001, Nippon Soda K.K.; molecular weight of about 1000], and the resultant mixture was stirred at room temperature for 4 hours so that they were reacted. The reaction mixture was poured into 1 liter of water while the resulting mixture was stirred. The resultant precipitate was collected by filtration and dried, whereby a cross-linked polyaniline derivative with cross-linked nitrogen atoms was obtained in an amount of 1.548 g.

When the resultant cross-linked polyaniline derivative was analyzed by infrared absorption spectroscopy, absorptions at 1650 cm$^{-1}$ (C=O stretching) and 2850–2950 cm$^{-1}$ (aliphatic C—H stretching) assigned to the structure represented by the above formula (II) were observed, and absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 5% of the total number of nitrogen atoms contained in the polyaniline chains. $^{13}$C NMR spectrum revealed m/(n+m)=0.46.

A viscous solution was obtained by adding 1 g of the resultant cross-linked polyaniline derivative in N-methyl-2-pyrrolidone and stirring at room temperature. From the resulant solution, a film was obtained by spinning or extrusion. The film thus-produced had very high elasticity and was not broken by bending. Its conductivity was 1.0 S/cm after having been doped by immersing it in a 20% aqueous solution of hydrochloric acid for 24 hours.

A similar processing to the above described processing could be carried out using organic solvents such as N,N-dimethylacetamide, N,N-dimethylformamide or pyridine instead of N-methyl-2-pyrrolidone.

Example 14

A solution was prepared by completely dissolving 1 g of the reduced polyaniline (number average molecular weight 12,000) in 60 ml of N-methyl-2-pyrrolidone under a nitrogen atmosphere. To the resultant solution was added a solution prepared by completely dissolving 4.40 g (40% by mol to aniline units) of a 50 wt. % solution of poly(1,2-butadiene) in butyl acetate [TP-1001, Nippon Soda K.K.; molecular weight of about 1000], followed by the same treatment as in Example 13 to obtain 5.390 g of a cross-linked polyaniline derivative with cross-linked nitrogen atoms.

When the resultant cross-linked polyaniline derivative was analyzed by infrared absorption spectroscopy, absorptions at 1650 cm$^{-1}$ (C=O stretching) and 2850–2950 cm$^{-1}$ (aliphatic C—H stretching) assigned to the structure represented by the above formula (II) were observed, and absorptions at 1600, 1500, 1300, 1170 and 820 cm$^{-1}$ assigned to the polyanillne structure represented by the general formula (I) were observed, whereby the main polymer chain of the cross-linked polyaniline derivative was confirmed to have a polyaniline structure. From the yield of the reaction, the number of cross-linked nitrogen atoms was found to be about 5% of the total number of nitrogen atoms contained in the polyaniline chains. $^{13}$C NMR spectrum revealed m/(n+m)=0.40.

A gel was obtained by adding 1 g of the resultant cross-linked polyaniline derivative in N-methyl-2-pyrrolidone and stirring at room temperature. From the resulant gel, a film was obtained by spinning or extrusion. The film thus-produced had very high elasticity and was not broken by bending. Its conductivity was 0.005 S/cm after having been doped in the same manner as in Example 13.

A similar processing to the above described processing could be carried out using organic solvents such as N,N-dimethylacetamide, N,N-dimethylformamide or pyridine instead of N-methyl-2-pyrrolidone.

Example 15

To 60 ml of N-methyl-2-pyrrolidone was add 1 g of the resultant reduced polyaniline (number average molecular weight 12,000) to completely dissolve under a nitrogen atmosphere.

A solution of poly(ethylene oxide) diglycolic acid which was a polyether having carboxyl groups in both terminals (molecular weight of about 3000, produced by Kawaken Fine Chemical Co.) was prepared by dissolving 0.825 g of it in 10 ml of dried benzene, to which 1 ml of oxalic acid chloride was then added. The resultant mixture was treated by heating to 50° C. for 2 hours and then to 80° C. for 1 hour to remove benzene and unreacted oxalyl chloride. Thus polyether having chloroformyl groups in both terminals was obtained in an amount of 0.830 g. The chloroformyl group was confirmed by the fact that an absorption at 1795 cm$^{-1}$ in an infrared absorption spectrum was observed, while an absorption at 1770 cm$^{-1}$ assigned to carboxyl group disappeared.

A solution prepared by dissolving the thus resultant polyether having chloroformyl groups in 10 ml of dried chloroform was added slowly to the solution of reduced polyaniline and the resultant mixture was stirred for 4 hours at room temperature so that they were reacted. The reaction mixture was poured into 1 liter of water while the resulting mixture was stirred. The resulting precipitate was collected by filtration. After treatment with an aqueous ammonia to remove the formed hydrogen chloride, the product was dried to obtain 1.820 g of a cross-linked polyaniline derivative.

When the resultant cross-linked polyaniline derivative was analyzed by infrared absorption spectroscopy, absorptions at 1650 cm$^{-1}$(C=O stretching) and 2850–2950 cm$^{-1}$ (aliphatic C—H stretching) assigned to the structure represented by the above formula (II) were observed, and absorptions at 1600, 1500, 1300, 1170 and 820 cm$^{-1}$ assigned to the polyaniline structure represented by the general formula (I) were observed, whereby the main chain of the cross-linked polyaniline derivative was confirmed to have a polyaniline structure. From the yield of the reaction, the number of cross-linked nitrogen atoms was found to be about 5% of the total number of nitrogen atoms contained in the polyaniline chains. $^{13}$C NMR spectrum revealed m/(n+m)=0.47.

When a film of the resultant cross-linked polyaniline derivative was produced in a similar manner to Example 1, its conductivity was 0.5 S/cm after having been doped by immersing in a 20% aqueous solution of hydrochloric acid for 24 hours.

The cross-linked polyaniline derivative also gelled in the same organic solvents as in Example 1.

The resultant gel was capable of swelling in water and alcohols such as methanol or ethanol, thereby it being easily processable.

Example 16

A cross-linked polyaniline derivative was produced in an amount of 1.54 g in a similar manner to Example 15 except that poly(ethylene oxide) diglycolic acid (0.549 g) (molecular weight of about 1000; produced by Kawaken Fine Chemical Co.) instead of poly(ethylene oxide) diglycolic acid having a molecular weight of about 1000.

When the resultant cross-linked polyaniline derivative was analyzed by infrared absorption spectroscopy, the nearly the same absorptions as those in Example 15 were observed., whereby the cross-linked polyaniline derivative was confirmed to have polyaniline chains. From the yield of the reaction, the number of cross-linked nitrogen atoms was found to be about 10% of the total number of nitrogen atoms contained in the polyaniline chains.

When a film of the resultant cross-linked polyaniline derivative was produced in a similar manner to Example 15, its conductivity was 0.1 S/cm after having been doped.

The resultant gel was capable of swelling in water and alcohols such as methanol or ethanol, thereby being processable.

Example 17

To 60 ml of N-methyl-2-pyrrolidone was add 1 g of the resultant reduced polyaniline (number average molecular weight 12,000) to completely dissolve under a nitrogen atmosphere.

A solution produced by dissolving 0.0165 g of polyethyleneoxide diglycolic acid which was a polyether having carboxyl groups in both terminals (molecular weight of about 3000, produced by Kawaken Fine Chemical Co.) in 30 ml of N-methyl-2-pyrrolidone was chilled to 0° C. After addition of 0.0023 g of dicyclohexylcarbodiimide, the mixture was stirred at 0° C. for 1 hour. To the resultant mixture was added the solution of reduced polyaniline, and the reaction mixture was stirred for 6 hours while the temperature was raised slowly to room temperature. The reaction mixture was poured into 1 liter of diluted hydrochloric acid with stirring, and resulting precipitate was collected by filtration. After the precipitate was exposed to an ammonia gas and washed with water to remove hydrogen chloride, it was dried to obtain 1.015 g of a cross-linked polyaniline derivative.

When the resultant cross-linked polyaniline derivative was analyzed by infrared absorption spectroscopy, absorptions at 1650 cm$^{-1}$ (C=O stretching) and 2850–2950 cm$^{-1}$ (aliphatic C—H stretching) assigned to the structure represented by the above formula (II) were observed, and absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 5% of the total number of nitrogen atoms contained in the polyaniline chains. $^{13}$C NMR spectrum revealed m/(n+m)=0.49.

A film having very high elasticity was produced by dissolving 1 g of the resultant cross-linked polyaniline derivative in 5 g of N-methyl-2-pyrrolidone and casting the resultant solution. Its conductivity was 0.1 S/cm after having been doped by immersing it in a 20% aqueous solution of hydrochloric acid for 24 hours.

The cross-linked polyaniline derivative was also processable using organic solvents such as N,N-dimethylacetamide, N,N-dimethylformamide, pyridine, chloroform, dichloroethane, dichloromethane and tetrahydrofuran in place of N-methyl-2-pyrrolidone.

Example 18

A cross-linked polyaniline derivative was produced in an amount of 1.990 g in a similar manner to Example 17 except that polyethyleneoxide diglycolic acid (molecular weight of about 1000; produced by Kawaken Fine Chemical Co.) (1.098 g) was used instead of polyethyleneoxide diglycolic acid having a molecular weight of about 1000, and dicyclohexylcarbodiimide (0.452 g) was used.

When the resultant cross-linked polyaniline derivative was analyzed by infrared absorption spectroscopy, nearly the same absorptions as those in Example 17 were observed., whereby the main chain of the cross-linked polyaniline derivative was confirmed to have a polyaniline structure. From the yield of the reaction, the number of cross-linked nitrogen atoms was found to be about 10% of the total number of nitrogen atoms contained in the polyaniline chains.

When a film of the resultant cross-linked polyaniline derivatives was produced in a similar manner to Example 17, its conductivity was 0.01 S/cm after having been doped, The cross-linked polyaniline derivative was also processable with the same organic solvent as described in Example 17.

Example 19

A solution was prepared by completely dissolving 1 g of a reduced polyaniline (number average molecular weight 12,000) in 30 ml of N-methyl-2-pyrrolidone under a nitrogen atmosphere.

A solution produced by dissolving 1.97 g of 1,4-polybutadiene having carboxyl groups in both terminals (Hycar CTB, molecular weight of about 3600; produced by Goodrich Co.) in 30 ml of pyridine was chilled to 0° C. After 0.2266 g of dicyclohexylcarbodiimide was added, the mixture was stirred at 0° C. for 1 hour. To the resultant mixture was added the solution of reduced polyaniline, and the reaction mixture was stirred for 6 hours while the temperature was raised slowly to room temperature. The reaction mixture was poured into 1 liter of diluted hydrochloric acid with stirring, and resulting precipitate was collected by filtration. After the precipitate was exposed to an ammonia gas and washed with water to remove hydrogen chloride, it was dried to obtain 2.78 g of a cross-linked polyaniline derivative.

When the resultant cross-linked polyaniline derivative was analyzed by infrared absorption spectroscopy, absorptions at 1645 cm$^{-1}$ (C=O stretching) and 2850–2950 cm$^{-1}$ (aliphatic C—H stretching) assigned to the structure represented by the above formula (II) were observed, and absorptions at 1600, 1500, 1300, 1170 and 820 cm$^{-1}$ assigned to the polyaniline structure represented by the general formula (I) were observed, whereby the main chain of the cross-linked polyaniline derivative was confirmed to have a polyaniline structure. From the yield of the reaction, the number of cross-linked nitrogen atoms was found to be about 9% of the total number of nitrogen atoms contained in the pelyanlline chains. $^{13}$C NMR spectrum revealed m/(n+m)=0.44.

A film having very high elasticity was produced by dissolving 1 g of the resultant cross-linked polyaniline derivatives in 5 g of N-methyl-2-pyrrolidone and casting the resultant solution. Its conductivity was 0.1 S/cm after having been doped by immersing in a 20% solution of hydrochloric acid for 24 hours.

The cross-linked polyaniline derivative was also processable with organic solvents such as N,N-dimethylacetamide, N,N-dimethylformamide, pyridine, chloroform, dichloroethan, dichloromethane and tetrahydrofuran in addition to N-methyl-2-pyrrolidone.

Example 20

A cross-linked polyaniline derivative was produced in an amount of 8.77 g in a similar manner to Example 19 except that 7.88 g of Hycar CTB and 0.9064 g of dicyclohexylcarbodiimide were used.

When the resultant cross-linked polyaniline derivative was analyzed by infrared absorption spectroscopy, nearly the same absorptions as those in Example 19 were observed, whereby the main polymer chain of the cross-linked polyaniline derivative was confirmed to have a polyanillne structure. From the yield of the reaction, the number of cross-linked nitrogen atoms was found to be about 40% of the total number of nitrogen atoms contained in the polyaniline chains. $^{13}$C NMR spectrum revealed m/(n+m)=0.39.

Film and fibers having very high elasticity were produced by adding 1 g of the resultant cross-linked polyaniline derivatives in 20 g of N-methyl-2-pyrrolidone to produce a gel. Its conductivity was 0.001 S/cm after having been doped in the same manner as in Example 19.

The cross-linked polyanlline derivative was also processable with organic solvents such as N,N-dimethylacetamide, N,N-dimethylformamide, pyridine, chloroform, dichloroethane, dichloromethane and tetrahydrofuran in place of N-methyl-2-pyrrolidone.

Example 21

1 g of a reduced polyaniline (number average molecular weight 12,000) was completely dissolved in 30 ml of N-methyl-2-pyrrolidone under a nitrogen atmosphere.

A solution produced by dissolving 1.97 g of copoly(butadiene/acrylonitrile) having carboxyl groups in both terminals (Hycar CTBN, molecular weight of about 3600, acrylonitrile: 10% by mol; produced by Goodrich Co.) in 30 ml of pyridine was chilled to 0° C. After 0.2266 g of dicyclohexylcarbodiimide was added, the mixture was stirred at 0° C. for 1 hour. To the resultant mixture was added the solution of reduced polyaniline, and the reaction mixture was stirred for 6 hours while the temperature was raised slowly to room temperature. The reaction mixture was poured into 1 liter of diluted hydrochloric acid with stirring, and resulting precipitate was collected by filtration. After the precipitate was exposed to an ammonia gas and washed with water to remove hydrogen chloride, it was dried to obtain 2.78 g of a cross-linked polyaniline derivative.

When the resultant cross-linked polyanlline derivative was analyzed by infrared absorption spectroscopy, absorptions at 1645 cm$^{-1}$ (C=O stretching), 2236 cm$^{-1}$ (CN) and 2850–2950cm$^{-1}$ (aliphatic C—H stretching) assigned to the structure represented by the above formula (II) were observed, and absorptions at 1600, 1500, 1300, 1170 and 820 cm$^{-1}$ assigned to the polyaniline structure represented by the general formula (I) were observed, whereby the main polymer chain of the cross-linked polyanlline derivative was confirmed to have a polyaniline structure. From the yield of the reaction, the number of cross-linked nitrogen atoms was found to be about 9% of the total number of nitrogen atoms contained in the polyaniline chains. $^{13}$C NMR spectrum revealed m/(n+m)=0.42.

A film having very high elasticity was produced by dissolving 1 g of the resultant cross-linked polyaniline derivatives in 5 g of N-methyl-2-pyrrolidone and casting the resultant solution. Its conductivity was 0.1 S/cm after having been doped by immersing in a 20% aqueous solution of hydrochloric acid for 24 hours.

The cross-linked polyaniline derivative was also processable with organic solvents such as N,N-dimethylacetamide, N, N-dimethylformamide, pyridine, chloroform, dichloroethane, dichloromethane and tetrahydrofuran in place of N-methyl-2-pyrrolidone.

Example 22

A cross-linked polyaniline derivative was produced in an amount of 4.78 g in a similar manner to Example 21 except that Hycar CTBN (3.94 g) was used.

When the resultant cross-linked polyaniline derivative was analyzed by infrared absorption spectroscopy, nearly the same absorptions as those in Example 21 were observed, whereby the main polymer chain of the cross-linked polyaniline derivative was confirmed to have a polyaniline structure. From the yield of the reaction, the number of cross-linked nitrogen atoms was found to be about 40% of the total number of nitrogen atoms contained in the polyaniline chains. $^{13}$C NMR spectrum revealed m/(n+m)=0.34.

A film or fibers having very high elasticity was produced by adding 1 g of the resultant cross-linked polyanlline derivatives in 9 g of N-methyl-2-pyrrolidone to produce a gel. Its conductivity was 0.01 S/cm after having been doped in the same manner as in Example 21.

The cross-linked polyaniline derivative was also processable with the same organic solvent as described in Example 21.

Example 23

A solution was prepared by completely dissolving 1 g of a reduced polyaniline (number average molecular weight 12,000) in 30 ml of N-methyl-2-pyrrolidone under a nitrogen atmosphere.

A solution produced by dissolving 0.14 g of polysiloxane having carboxyl groups in both terminals (TSF4770; molecular weight of about 2500, produced by Toshiba Silicone Co.) 30 ml of pyridine was chilled to 0° C. After 0.0226 g of dicyclohexylcarbodiimide was added, the mixture was stirred at 0° C. for 1 hour. To the resultant mixture was added the solution of reduced polyaniline, and the reaction mixture was stirred for 6 hours while the temperature was raised slowly to room temperature. The reaction mixture was poured into 1 liter of methanol with stirring, and resulting precipitate was collected by filtration. After the precipitate was exposed to an ammonia gas and washed with water, it was dried to obtain 1.11 g of a cross-linked polyaniline derivative.

When the resultant cross-linked polyaniline derivative was analyzed by infrared absorption spectroscopy, absorptions at 1645 cm$^{-1}$ (C=O stretching), 2980 cm$^{-1}$ (methyl group C—H stretching), 1260 cm$^{-1}$ (methyl group, symmetric deformation) and 1020 cm$^{-1}$ (Si—O stretching) assigned to the structure of formula (II) were observed. Further, absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 0.7% of the total number of nitrogen atoms contained in the polyaniline chains. $^{13}$C NMR spectrum revealed m/(n+m)=0.49.

Films and fibers having very high elasticity were produced by dissolving 1 g of the resultant cross-linked polyaniline derivatives in 9 g of N-methyl-2-pyrrolidone. The resultant film had conductivity of 1.1 S/cm after having been doped by immersing in a 20% aqueous solution of hydrochloric acid for 24 hours.

The cross-linked polyaniline derivative was also processable with organic solvents such as N,N-dimethylacetamide, N,N-dimethylformamide, pyridine, chloroform, dichloroethane, dichloromethane and tetrahydrofuran in place of N-methyl-2-pyrrolidone.

Example 24

A solution was prepared by completely dissolving 1 g of a reduced polyaniline (number average molecular weight 12,000) in 30 ml of N-methyl-2-pyrrolidone under a nitrogen atmosphere.

A solution produced by dissolving 0.055 g of hydrogenated polybutadiene having carboxyl groups in both terminals (CI-1000; molecular weight of about 1000, produced by Nippon Soda Co.) in 30 ml of pyridine was chilled to 0° C. After 0.0226 g of dicyclohexylcarbodiimide was added, the mixture was stirred at 0° C. for 1 hour. To the resultant mixture was added the solution of reduced polyaniline, and the reaction mixture was stirred for 6 hours while the temperature was raised slowly to room temperature. The reaction mixture was poured into 1 liter of methanol with stirring, and resulting precipitate was collected by filtration. After the precipitate was exposed to an ammonia gas and washed with water, it was dried to obtain 1.05 g of a cross-linked polyaniline derivative.

When the resultant cross-linked polyaniline derivative was analyzed by infrared absorption spectroscopy, absorptions at 1645 $cm^{-1}$ (C=O stretching vibration), 2850–2980 $cm^{-1}$ (methyl group and methylene chain: C—H stretching vibration), 1260 $cm^{-1}$ (methyl group, symmetric deformation vibration) and 1020 $cm^{-1}$ (Si—O stretching vibration) assigned to the structure of formula (II) were observed. Further, IR absorptions at 1600, 1500, 1300, 1170 and 820 $cm^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 0.9% of the total number of nitrogen atoms contained in the polyaniline chains. $^{13}C$ NMR spectrum revealed m/(n+m)=0.49.

Films and fibers having very high elasticity were produced by dissolving 1 g of the resultant cross-linked polyaniline derivatives in 9 g of N-methyl-2-pyrrolidone. The resultant film had conductivity of 1.1 S/cm after having been doped by immersing in a 20% aqueous solution of hydrochloric acid for 24 hours.

The cross-linked polyaniline derivative was also processable with organic solvents such as N,N-dimethylacetamide, N,N-dimethylformamide, pyridine, chloroform, dichloroethane, dichloromethane and tetrahydrofuran in addition to N-methyl-2-pyrrolidone.

Example 25

A solution was prepared by completely dissolving 1 g of a reduced polyaniline in 30 ml of N-methyl-2-pyrrolidone under a nitrogen atmosphere.

A solution prepared by dissolving 1.02 g of polyester having carboxyl groups in both terminals (IPU-22A: [HO—[C(=O)(CH$_2$)$_6$—C(CH$_3$)=CH—(CH$_2$)$_2$—CH=C(CH$_3$)—(CH$_2$)$_6$—C(=O)O]r—H; r=3–4, molecular weight of about 1240; produced by Okamura Seiyu K.K.) in 30 ml of N-methyl-2-pyrrolidone was chilled to 0° C. After adding 0.1697 g of dicyclohexylcarbodiimide, the mixture was stirred at 0° C. for 1 hour. To the resultant mixture was added the above solution of reduced polyaniline, and the reaction mixture was stirred for 6 hours while the temperature was raised slowly to room temperature. The reaction mixture was poured into 1 liter of diluted hydrochloric acid with stirring, and resulting precipitate was collected by filtration. After the precipitate was exposed to an ammonia gas and washed with water to remove hydrogen chloride, it was dried to obtain 1.94 g of a cross-linked polyaniline derivative.

When the resultant cross-linked polyaniline derivative was analyzed by infrared absorption spectroscopy, absorptions at 1650 $cm^{-1}$ (C=O stretching) and 2850–2950 (aliphatic C—H stretching) assigned to the structure represented by the above formula (II) were observed, and IR absorptions at 1600, 1500, 1300, 1170 and 820 $cm^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 14% of the total number of nitrogen atoms contained in the polyaniline chains. $^{13}C$ NMR spectrum revealed m/(n+m)=0.44.

A film having very high elasticity was produced by dissolving 1 g of the resultant cross-linked polyaniline derivative in 5 g of N-methyl-2-pyrrolidone and casting the resultant solution. Its conductivity was 0.1 S/cm after having been doped by immersing in a 20% aqueous solution of hydrochloric acid for 24 hours.

The cross-linked polyaniline derivative also gelled in organic solvents such as N,N-dimethylacetamide, N,N-dimethylformamide, pyridine, chloroform, dichloroethane, dichloromethane and tetrahydrofuran in addition to N-methyl-2-pyrrolidone.

Example 26

A solution was prepared by completely dissolving 1 g of a reduced polyaniline (number average molecular weight 12,000) in 30 ml of N-methyl-2-pyrrolidone under a nitrogen atmosphere.

To the solution of the reduced polyaniline was added 0.225 g of ethyleneglycol trimellitic anhydride ester (Ricaresin TMEG which has carboxylic anhydride structure in both terminals produced by Shinnippon Rica K.K.), and the resultant mixture was stirred at 50° C. for 8 hours. The reaction mixture was poured into 1 liter of diluted hydrochloric acid with stirring, and resulting precipitate was collected by filtration. After the precipitate was exposed to an ammonia gas and washed with water, it was dried to obtain 1.20 g of a cross-linked polyaniline derivative.

When the resultant cross-linked polyaniline derivative was analyzed by infrared absorption spectroscopy, absorptions at 1650 $cm^{-1}$ (C=O stretching), 2850–2950 $cm^{-1}$ (aliphatic C—H stretching) assigned to the structure of formula (II) were observed. Further, absorptions at 1600, 1500, 1300, 1170 and 820 $cm^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 9% of the total number of nitrogen atoms contained in the polyaniline chains. $^{13}C$ NMR spectrum revealed m/(n+m)=0.46.

The cross-linked polyaniline derivative gelled by stirring 1 g thereof in 5 g of N-methyl-2-pyrrolidone at room temperature. From the resultant gel, a film was obtained by spinning or extrusion. Its conductivity was 0.9 S/cm after having been doped by immersing it in a 20% aqueous solution of hydrochloric acid for 24 hours.

The cross-linked polyaniline derivative also gelled in organic solvents such as N,N-dimethylacetamide, N,N-dimethylformamide, pyridine, chloroform, dichloroethane, dichloromethane and tetrahydrofuran, in addition to the N-methyl-2-pyrrolidone.

Example 27

A solution was prepared by completely dissolving 1 g of a reduced polyaniline (number average molecular weight 12,000) in 50 ml of N-methyl-2-pyrrolidone under a nitrogen atmosphere.

To the solution of the reduced polyaniline was added 0.12 g of pyromellitic dianhydride as a tetracarboxylic acid dianhydride, and the resultant mixture was stirred at 50° C. for 4 hours and then at 80° C. for 4 hours. The reaction mixture was poured into 1 liter of methanol with stirring, and resulting precipitate was collected by filtration. After the precipitate was sufficiently washed with water, it was dried to obtain 1.11 g of a cross-linked polyaniline derivative.

When the resultant cross-linked polyaniline derivative was analyzed by infrared absorption spectroscopy, absorptions at 3300 cm$^{-1}$ (O—H stretching) and 1650 cm$^{-1}$ (C=O stretching) assigned to the structure of formula (VI) were observed. Further, absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 9% of the total number of nitrogen atoms contained in the polyaniline chains. $^{13}$C NMR spectrum revealed m/(n+m)=0.48.

The cross-linked polyaniline derivative gelled by stirring 1 g thereof in 5 g of N-methyl-2-pyrrolidone at room temperature, from which a film or fibers could be obtained. The resultant film had a conductivity of 2×10$^{-5}$ S/cm. Its conductivity was 1.5 S/cm after having been doped by exposing the film to a gas of hydrochloric acid for 24 hours and dried.

The cross-linked polyaniline derivative was also processable after gelling in organic solvents such as N,N-dimethylacetamide, N,N-dimethylformamide, pyridine, chloroform, dichloroethane, dichloromethane and tetrahydrofuran in place of the N-methyl-2-pyrrolidone.

Example 28

A cross-linked polyanlline derivative was produced in an amount of 0.18 g in a similar manner to Example 27 except that 3,3',4,4'-benzophenonetetracarboxylic acid dianhydride (0.18 g) was used as a tetracarboxylic dianhydride.

When the resultant cross-linked polyaniline derivative was analyzed by infrared absorption spectroscopy, absorptions at 3300 cm$^{-1}$ (O—H stretching) and 1650 cm$^{-1}$ (C=O stretching) assigned to the structure of formula (VI) were observed. Further, absorptions at 1600, 1500, 1300, 1170 and 820 cm$^{-1}$ assigned to the polyaniline structure represented by the general formula (I) were observed, whereby the main polymer chain of the cross-linked polyanlline derivative was confirmed to have a polyaniline structure. From the yield of the reaction, the number of cross-linked nitrogen atoms was found to be about 4.4% of the total number of nitrogen atoms contained in the polyaniline chains. $^{13}$C NMR spectrum revealed m/(n+m)=0.47.

The cross-linked polyanlline derivative gelled by stirring 1 g thereof in 5 g of N-methyl-2-pyrrolidone at room temperature, from which a film or fibers could be obtained. The resultant film had a conductivity of 1×10$^{-7}$ S/cm. Its conductivity was 0.9 S/cm after having been doped by exposing the film to a gas of hydrochloric acid for 24 hours and dried.

The cross-linked polyaniline derivative was also processable with the same organic solvent as described in Example 27.

Example 29

A cross-linked polyanlline derivative was produced in an amount of 1.10 g in a similar manner to Example 27 except that 3,3',4,4'-diphenylsulfonetetracarboxylic dianhydride (0.20 g) was used as a tetracarboxylic acid dianhydride.

When the resultant cross-linked polyaniline derivative was analyzed by infrared absorption spectroscopy, absorptions at 3300 cm$^{-1}$ (O—H stretching) and 1650 cm$^{-1}$ (C=O stretching) assigned to the structure of formula (VI) were observed. Further, absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 5.0% of the total number of nitrogen atoms contained in the polyaniline chains. $^{13}$C NMR spectrum revealed m/(n+m)=0.46.

The cross-linked polyaniline derivative gelled by stirring 1 g thereof in 5 g of N-methyl-2-pyrrolidone at room temperature, from which a film or fibers could be obtained. The resultant film had a conductivity of 1×10$^{-7}$ S/cm. Its conductivity was 0.9 S/cm after having been doped by exposing the film to a gas of hydrochloric acid for 24 hours and dried.

The cross-linked polyaniline derivative was also processable with the same organic solvent as described in Example 27.

Example 30

A cross-linked polyaniline derivative was produced in an amount of 1.03 g in a similar manner to Example 27 except that 1,3,3a,4,5,9b-hexahydro-5-(tetrahydro-2,5-dioxo-3-furanyl)naphtho[1,2-c]furan-1,3-dione (0.082 g) was used as a tetracarboxylic acid dianhydride.

When the resultant cross-linked polyaniline derivative was analyzed by infrared absorption spectroscopy, absorptions at 3300 cm$^{-1}$ (O—H stretching) and 1650 cm$^{-1}$ (C=O stretching) assigned to the structure of formula (VI) were observed. Further, absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 1.8% of the total number of nitrogen atoms contained in the polyaniline chains. $^{13}$C NMR spectrum revealed m/(n+m)=0.49.

The cross-linked polyaniline derivative gelled by stirring 1 g thereof in 5 g of N-methyl-2-pyrrolidone at room temperature, from which a film or fibers could be obtained.

The resultant film had a conductivity of $1 \times 10^{-7}$ S/cm. Its conductivity was 2.0 S/cm after having been doped by exposing the film to a gas of hydrochloric acid for 24 hours and dried.

The cross-linked polyaniline derivative was also processable with the same organic solvent as described in Example 27.

Example 31

A cross-linked polyaniline derivative was produced in an amount of 1.13 g in a similar manner to Example 27 except that 4,4'-oxydiphthalic anhydride (0.17 g) was used as a tetracarboxylic acid dianhydride.

When the resultant cross-linked polyaniline derivative was analyzed by infrared absorption spectroscopy, absorptions at 3300 cm$^{-1}$ (O—H stretching) and 1650 cm$^{-1}$ (C=O stretching) assigned to the structure of formula (VI) were observed. Further, absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 7.6% of the total number of nitrogen atoms contained in the polyaniline chains. $^{13}$C NMR spectrum revealed m/(n+m)=0.46.

The cross-linked polyaniline derivative gelled by stirring 1 g thereof in 5 g of N-methyl-2-pyrrolidone at room temperature, from which a film or fibers could be obtained. The resultant film had a conductivity of $4 \times 10^{-6}$ S/cm. Its conductivity was 0.2 S/cm after having been doped by exposing the film to a gas of hydrochloric acid for 24 hours and dried.

The cross-linked polyaniline derivative was also processable with the same organic solvent as described in Example 27.

Example 32

A polystyrene having carboxyl groups in both terminals was synthesized according to the process described in Y. Yamashita, T. Hane, J. Polym. Sci., Polym. Chem. Ed., 11, 425 (1973). A solution of red disodium α-methylstyrene tetramer in tetrahydrofuran was prepared by reacting α-methylstyrene in tetrahydrofuran at −20° C. in the presence of metal sodium. To the solution was added a solution of styrene in tetrahydrofuran at 0° C., and the resultant mixture was subjected to polymerization with stirring to obtain a solution of disodium polystyrene in tetrahydrofuran. Excess carbon dioxide was blown through the solution to cause reaction at room temperature. Excess carbon dioxide was removed under reduced pressure. The resultant solution was poured into methanol acidified with hydrochloric acid, and the product was lyophilized with benzene to obtain a polystyrene having free carboxyl groups in terminals, which has a number average molecular weight of 7000. When a solution of it in N,N-dimethylformamide to which excess potassium hydroxide was added was subjected to back titration using an aqueous solution of potassium hydrogen phthalate, the number of terminal carboxyl groups was confirmed to be about 2. A solution prepared by dissolving 3.81 g of the resultant polystyrene having carboxyl groups in both terminals in 30 ml of N-methyl-2-pyrrolidone was chilled to 0° C. After addition of 0.2262 g of dicyclohexylcarbodiimide to the resultant solution, it was stirred at 0° C. for 1 hour. To the solution was then added a solution of reduced polyaniline (1 g), and the reaction mixture was stirred for 6 hours while the temperature was raised slowly to room temperature. The reaction mixture was poured into 1 liter of diluted hydrochloric acid with stirring, and resulting precipitate was collected by filtration. After the precipitate was exposed to an ammonia gas and washed with water to remove hydrogen chloride, it was dried to obtain 4.75 g of a cross-linked polyaniline derivative.

When the resultant cross-linked polyaniline derivative was analyzed by infrared absorption spectroscopy, absorptions at 1650 cm$^{-1}$ (C=O stretching) and 2850–2950 cm$^{-1}$ (aliphatic C—H stretching) assigned to the structure of formula (II) were observed. Further, IR absorptions at 1600, 1500, 1300, 1170 and 820 cm$^{-1}$ assigned to the polyaniline structure represented by the general formula (I) were observed, whereby the cross-linked polyaniline derivative was confirmed to have polyaniline chains. From the yield of the reaction, the number of cross-linked nitrogen atoms was found to be about 10% of the total number of nitrogen atoms contained in the polyaniline chains. $^{13}$C NMR spectrum revealed m/(n+m)=0.46.

A film was produced by spinning or extrusion of a solution which was prepared by dissolving 1 g of the resultant cross-linked polyanlline derivative in 5 g of N-methyl-2-pyrrolidone at room temperature with stirring. Its conductivity was 0.09 S/cm after having been doped by immersing it in a 20% aqueous solution of hydrochloric acid for 24 hours.

The cross-linked polyaniline derivative also gelled in organic solvents such as N,N-dimethylacetamide, N,N-dimethylformamide, pyridine, chloroform, dichloroethane, dichloromethane and tetrahydrofuran, in addition to the N-methyl-2-pyrrolidone.

Example 33

Amide trimer having carboxyl groups in both terminals was synthesized by reacting 1 mol of hexamethylenediamine with 2 mol of adipic acid. A solution prepared by dissolving 0.204 g of the resulted trimer amide in 30 ml of N-methyl-2-pyrrolidone was chilled to 0° C. After addition of 0.2261 g of dicyclohexylcarbodiimide to the resultant solution, it was stirred at 0° C. for 1 hour. To the solution was then added a solution of reduced polyaniline (1 g), and the reaction mixture was stirred for 6 hours while the temperature was raised slowly to room temperature. The reaction mixture was poured into 1 liter of diluted hydrochloric acid with stirring, and resulting precipitate was collected by filtration. After the precipitate was exposed to an ammonia gas and washed with water to remove hydrogen chloride, it was dried to obtain 1.152 g of a cross-linked polyaniline derivative.

When the resultant cross-linked polyaniline derivative was analyzed by infrared absorption spectroscopy, an absorption at 1650 cm$^{-1}$ (C=O stretching) and 2850–2950 cm$^{-1}$ (aliphatic C—H stretching) assigned to the structure of formula (II) were observed. Further, absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 10% of the total number of nitrogen atoms contained in the polyaniline chains. $^{13}$C NMR spectrum revealed m/(n+m)=0.44.

A film was produced by spinning or extrusion of the solution which was prepared by dissolving 1 g of the resultant cross-linked polyanlline derivative in 5 g of N-methyl-2-pyrrolidone at room temperature with stirring. Its conductivity was 0.3 S/cm after having been doped by immersing it in a 20% aqueous solution of hydrochloric acid for 24 hours.

The cross-linked polyaniline derivative also gelled in organic solvents such as N,N-dimethylacetamide, N,N-dimethylformamide, pyridine, chloroform, dichloroethane, dichloromethane and tetrahydrofuran, in addition to the N-methyl-2-pyrrolidone.

Example 34

To a solution of 0.12 mols of methylenebis(4-phenylisocyanate) in N-methyl-2-pyrrolidone was added 0.10 mols of tetramethylene glycol, and the resultant mixture was subjected to reacting at 110° C. for 2 hours to obtain a polyurethane having isocyanate groups in both terminals (average molecular weight of 1900).

To a solution of 1 g of reduced polyaniline in 30 ml of N-methyl-2-pyrrolidone was added 1.042 g of the resultant polymer, and the reaction mixture was stirred at 50° C. for 8 hours. The reaction mixture was poured into 1 liter of diluted hydrochloric acid with stirring, and resulting precipitate was collected by filtration. After the precipitate was exposed to an ammonia gas and washed with water to remove hydrogen chloride, it was dried to obtain 2.01 g of a cross-linked polyaniline derivative.

When the resultant cross-linked polyaniline derivative was analyzed by infrared absorption spectroscopy, absorption at 1650 cm$^{-1}$ (C=O stretching) and 2850–2950 cm$^{-1}$ (aliphatic C—H stretching) assigned to the structure of formula (II) were observed. Further, IR absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 10% of the total number of nitrogen atoms contained in the polyanlline chains. $^{13}$C NMR spectrum revealed m/(n+m)= 0.46.

A film was produced by spinning or extrusion of the solution which was prepared by dissolving 1 g of the resultant cross-linked polyaniline derivative in 5 g of N-methyl-2-pyrrolidone at room temperature with stirring. Its conductivity was 0.7 S/cm after having been doped by immersing it in a 20% aqueous solution of hydrochloric acid for 24 hours.

The cross-linked polyaniline derivative also gelled in organic solvents such as N,N-dimethylacetamide, N, N-dimethylformamide, pyridine, chloroform, dichloroethane, dichloromethane and tetrahydrofuran, in addition to the N-methyl-2-pyrrolidone.

Example 35

To a solution of 0.12 mols of methylenebis(4-phenylisocyanate) in N-methyl-2-pyrrolidone was added 0.10 mols of tetramethylene glycol, and the resultant mixture was subjected to reacting at 200° C. for 5 hours to obtain a polyurea having isocyanate groups in both terminals (average molecular weight of 2200).

To a solution of 1 g of reduced polyaniline in 30 ml of N-methyl-2-pyrrolidone was added 1.207 g of the resultant polymer, and the reaction mixture was stirred at 50° C. for 8 hours. The reaction mixture was poured into 1 liter of diluted hydrochloric acid with stirring, and resulting precipitate was collected by filtration. After the precipitate was exposed to an ammonia gas and washed with water to remove hydrogen chloride, it was dried to obtain 2.20 g of a cross-linked polyaniline derivative.

When the resultant cross-linked polyaniline derivative was analyzed by infrared absorption spectroscopy, absorption at 1650 cm$^{-1}$ (C=O stretching) and 2850–2950 cm$^{-1}$ (aliphatic C—H stretching) assigned to the structure of formula (II) were observed. Further, absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 10% of the total number of nitrogen atoms contained in the polyaniline chains. $^{13}$C NMR spectrum revealed m/(n+m)= 0.46.

A film was produced by spinning or extrusion of the solution which was prepared by dissolving 1 g of the resultant cross-linked polyaniline derivative in 5 g of N-methyl-2-pyrrolidone at room temperature with stirring. Its conductivity was 0.9 S/cm after having been doped by immersing it in a 20% aqueous solution of hydrochloric acid for 24 hours.

The cross-linked polyaniline derivative also gelled in organic solvents such as N,N-dimethylacetamide, N,N-dimethylformamide, pyridine, chloroform, dichloroethane, dichloromethane and tetrahydrofuran, in addition to the N-methyl-2-pyrrolidone.

Example 36

To an aqueous solution containing 0.026 mols of hexamethylenediamine was added 0.05 mols of sodium carbonate and then a solution of m-benzenedisulfonyl dichloride 0.025 mols in methylene chloride with vigorous stirring. After allowed to react for 30 minutes, the resultant solid was separated by filtration and washed with water to obtain polysulfonamide having an average molecular weight of 3000. This polysulfonamide which had amino group or sulfonic acid groups as terminal groups was subjected to reacting with phosgene to convert the terminal groups to isocyanate groups or sulfonyl chloride groups. To a solution prepared by dissolving 1 g of reduced polyaniline in 30 ml of N-methyl-2-pyrrolidone was added 0.823 g of the resultant polymer, and the mixture was stirred at 50° C. for 8 hours. The reaction mixture was poured into 1 liter of diluted hydrochloric acid with stirring. The resulting precipitate was collected by filtration. After treated with an aqueous ammonia to remove the formed hydrogen chloride, the product was dried to obtain 1.820 g of a cross-linked polyaniline derivative.

When the resultant cross-linked polyaniline derivative was analyzed by infrared absorption spectroscopy, absorptions at 1650 cm$^{-1}$ (C=O), 1340 cm$^{-1}$ (—SO$_2$ N<), 1160 cm$^{-1}$ (SO$_2$ N<) and 2850–2950 cm$^{-1}$ (aliphatic C—H stretching) assigned to the structure represented by the above formula (II) were observed, and absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 5% of the total number of nitrogen atoms contained in the polyaniline chains. $^{13}$C NMR spectrum revealed m/(n+m)=0.48.

The cross-linked polyaniline derivative gelled by stirring 1 g thereof in 10 g of N-methyl-2-pyrrolidone at room temperature. From the resultant gel, a film was obtained by spinning or extrusion. Its conductivity was 1.5 S/cm after having been doped by immersing it in a 20% aqueous solution of hydrochloric acid for 24 hours.

The cross-linked polyanlline derivative also gelled in organic solvents such as N,N-dimethylacetamide, N,N-dimethylformamide, pyridine, chloroform, dichloroethane, dichloromethane and tetrahydrofuran, in addition to the N-methyl-2-pyrrolidone.

Example 37

A polystyrene having chloromethyl groups in the both terminals was synthesized according to the process described in H. C. Haas, N. W. Schuler, H. S. Kolesinski, J,Polym. Sci. A-1, 5, 2964 (1967). Namely, 2 g of styrene were dissolved in 4 ml of dried benzene containing 60 mg of p,p'-bischloromethylbenzoyl peroxide. The reaction mixture was subjected to reacting at 70° C. for 20 hours. The resultant polymer was precipitated in ethanol. After sufficiently washed with ethanol, it was dried under a reduced pressure to obtain a polymer having the number average molecular weight of 9400. The amount of chlorine atoms in the polymer was 0.736% which showed almost all terminals had chloromethyl groups.

To a solution prepared by dissolving 1 g of reduced polyaniline in 30 ml of N-methyl-2-pyrrolidone was added 2.58 g of the resultant polymer, and the mixture was stirred at 50° C. for 8 hours in a presence of pyridine. The reaction mixture was poured into 1 liter of diluted hydrochloric acid with stirring. The resulting precipitate was collected by filtration. After exposed it to an ammonia gas and washed with water to remove hydrogen chloride, the product was dried to obtain 3.40 g of a cross-linked polyaniline derivative.

When the resultant cross-linked polyanlline derivative was analyzed by infrared absorption spectroscopy, an absorption at 2850–2950 cm$^{-1}$ assigned to the structure represented assigned to the above formula (II) was observed, and absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 5% of the total number of nitrogen atoms contained in the polyaniline chains. $^{13}$C NMR spectrum revealed m/(n+m)=0.48.

The cross-linked polyaniline derivative gelled by stirring 1 g thereof in 5 g of N-methyl-2-pyrrolidone at room temperature. From the resultant gel, a film was obtained by spinning or extrusion. Its conductivity was 0.9 S/cm after having been doped by immersing it in a 20% aqueous solution of hydrochloric acid for 24 hours.

The cross-linked polyaniline derivative also gelled in organic solvents such as N,N-dimethylacetamide, N,N-dimethylformamide, pyridine, chloroform, dichloroethane, dichloromethane and tetrahydrofuran, in addition to the N-methyl-2-pyrrolidone.

Example 38

To a suspension of p-aminobenzenesulfonic acid in o-dichlorobenzene, N,N-dimethylformamide as a catalyst was added at 165° C., and 2 times by mol of phosgene were then added thereto (at a rate of 1 g/min). When a transparent solution was obtained, nitrogen gas is introduced to the solution to remove excess phosgene. The solvent was then removed to obtain 4-isocyanato benzenesulfonyl chloride. (Yield 76%, melting point 50°–52° C.)

To a solution prepared by dissolving 1 g of reduced polyanlline in 30 ml of N-methyl-2-pyrrolidone was added 0.1193 g of 4-isocyanato benzenesulfonyl chloride, and the resulting mixture was stirred at room temperature for 6 hours. The reaction mixture was poured into 1 liter of diluted hydrochloric acid with stirring. The resulting precipitate was collected by filtration. After treated with an aqueous ammonia to remove the formed hydrogen chloride, the product was dried to obtain 1.11 g of a cross-linked polyaniline derivative.

When the resultant cross-linked polyaniline derivative was analyzed by infrared absorption spectroscopy, absorption at 1650 cm$^{-1}$ (C=O), 1340 cm$^{-1}$ SO$_2$ N<), 1160 cm$^{-1}$ (SO$_2$ N<) and 2850–2950 cm$^{-1}$ (aliphatic C—H stretching) assigned to the structure represented by the above formula (II) were observed, and absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 10% of the total number of nitrogen atoms contained in the polyaniline chains. $^{13}$C NMR spectrum revealed m/(n+m)=0.46.

The cross-linked polyaniline derivative was dissolved by stirring 1 g thereof in 10 g of N-methyl-2-pyrrolidone at room temperature. From the resultant solution, a film was obtained by spinning or extrusion. Its conductivity was 0.1 S/cm after having been doped by immersing it in a 20% aqueous solution of hydrochloric acid for 24 hours.

The cross-linked polyaniline derivative also gelled in organic solvents such as N,N-dimethylacetamide, N,N-dimethylformamide, pyridine, chloroform, dichloroethane, dichloromethane and tetrahydrofuran, in addition to the N-methyl-2-pyrrolidone.

Example 39

To a suspension of 6-aminohexanoic acid in o-dichlorobenzene, N,N-dimethylformamide as a catalyst was added at 165 C., and 2 times by mol of phosgene were then added thereto (at a rate of 1 g/min). When a transparent solution was obtained, nitrogen gas is introduced to the solution to remove excess phosgene. The solvent was then removed to obtain 6-isocyanatohexanoyl chloride. (Yield 78%)

0.077 g of 6-isocyanatohexanoyl chloride resultant were added to a solution prepared by dissolving 1 g of reduced polyaniline in 30 ml of N-methyl-2-pyrrolidone, and the mixture was stirred at room temperature for 6 hours. The reaction mixture was poured into 1 liter of diluted hydrochloric acid with stirring. The resulting precipitate was collected by filtration. After exposed it to an ammonia gas and washed with water to remove hydrogen chloride, the product was dried to obtain 1.07 g of a cross-linked polyanlline derivative.

When the resultant cross-linked polyaniline derivative was analyzed by infrared absorption spectroscopy, absorptions at 1650 cm$^{-1}$ (C=O) and 2850–2950 cm$^{-1}$ (aliphatic C—H stretching) assigned to the structure represented by the above formula (II) were observed, and absorptions at 1600, 1500, 1300, 1170 and 820 cm$^{-1}$ assigned to the polyaniline structure represented by the general formula (I) were observed, whereby the main polymer chain of the cross-linked polyaniline derivative was confirmed to have a polyaniline structure. From the yield of the reaction, the number of cross-linked nitrogen atoms was found to be about 9% of the total number of nitrogen atoms contained in the polyanlline chains. $^{13}$C spectrum revealed m/(n+m)= 0.47.

The cross-linked polyanlline derivative gelled by stirring 1 g thereof in 5 g of N-methyl-2-pyrrolidone at room temperature. From the resultant gel, a film was obtained by spinning or extrusion. Its conductivity was 0.2 S/cm after having been doped by immersing it in a 20% aqueous solution of hydrochloric acid for 24 hours.

The cross-linked polyaniline derivative also gelled in organic solvents such as N,N-dimethylacetamide, N,N-dimethylformamide, pyridine, chloroform, dichloroethane, dichloromethane and tetrahydrofuran, in addition to the N-methyl-2-pyrrolidone.

What is claimed is:

1. A polyaniline derivative which comprises a polyaniline having number average molecular weight in a range of from 2,000 to 500,000 represented by the following formula (I) as the main polymer chain,

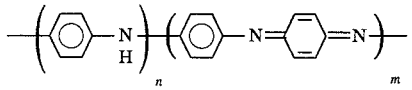

wherein m and n are 0 or an integer of at least 1,
m/(m+n)=0–1, and m+n=10–5,000,
and cross-linking units represented by the following formula (II)

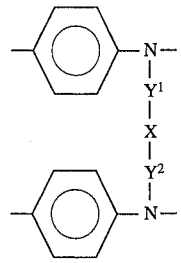

wherein Y$^1$—X—Y$^2$ in the formula (II) is

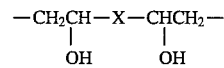

and X is a group represented by the following formula:

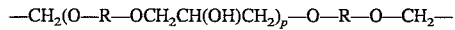

wherein R denotes a substituted or unsubstituted alkylene group, substituted or unsubstituted arylene group, or a group represented by the following formula

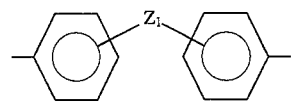

wherein Z$^1$ is a direct bond, —CH$_2$—, —CH(CH$_3$)— or —C(CH$_3$)$_2$—, and p is 0–2.

* * * * *